(12) United States Patent
Nakane et al.

(10) Patent No.: US 8,895,668 B2
(45) Date of Patent: Nov. 25, 2014

(54) CYCLOOLEFIN RESIN COMPOSITION

(75) Inventors: Toshio Nakane, Shizuoka (JP); Daisaku Ikeda, Tokyo (JP)

(73) Assignee: Polyplastics Co., Ltd., Tokyo (JP)

( * ) Notice: Subject to any disclaimer, the term of this patent is extended or adjusted under 35 U.S.C. 154(b) by 125 days.

(21) Appl. No.: 12/739,073

(22) PCT Filed: Aug. 5, 2008

(86) PCT No.: PCT/JP2008/063992
§ 371 (c)(1),
(2), (4) Date: Apr. 21, 2010

(87) PCT Pub. No.: WO2009/054172
PCT Pub. Date: Apr. 30, 2009

(65) Prior Publication Data
US 2010/0225032 A1    Sep. 9, 2010

(30) Foreign Application Priority Data

Oct. 23, 2007  (JP) .................................. 2007-275237

(51) Int. Cl.
*C08L 23/08* (2006.01)
*B29C 49/06* (2006.01)
(Continued)

(52) U.S. Cl.
CPC ......... *C08L 23/0823* (2013.01); *B29C 49/0005* (2013.01); *B29C 49/06* (2013.01); *B29C 51/10* (2013.01); *C08L 45/00* (2013.01); *B29C 45/0001* (2013.01); *B29C 47/0021* (2013.01); *B29C 47/0054* (2013.01); *B29C 47/0057* (2013.01); *B29C 47/40* (2013.01); *B29C 49/02* (2013.01); *B29C 49/10* (2013.01); *B29C 49/12* (2013.01); *B29C 51/02* (2013.01); *B29C 2791/006* (2013.01); *B29K 2023/38* (2013.01);

*B29K 2105/253* (2013.01); *B29L 2007/008* (2013.01); *C08L 2205/02* (2013.01); *C08L 2205/03* (2013.01)
USPC ......... 525/240; 264/537; 264/165; 264/328.1

(58) Field of Classification Search
None
See application file for complete search history.

(56) References Cited

U.S. PATENT DOCUMENTS 4,992,511 A * 2/1991 Yamamoto et al. ............. 525/97
5,239,006 A * 8/1993 Sagane et al. ................. 525/211
(Continued)

FOREIGN PATENT DOCUMENTS

CN    101023381 A    8/2007
EP      1791005 A    5/2007
(Continued)

OTHER PUBLICATIONS

International Search Report for Appln. No. PCT/JP2008/063992 dated Oct. 28, 2008.

(Continued)

*Primary Examiner* — Monica Huson
(74) *Attorney, Agent, or Firm* — Hoffman & Baron, LLP

(57) ABSTRACT

A cycloolefin resin composition which controls the flexibility of a cycloolefin resin and may be molded in an environment having a temperature exceeding about 140° C. is provided. A cycloolefin resin film, a cycloolefin resin preform and the like are provided utilizing the cycloolefin resin composition including two or more cycloolefin copolymer resins having Tg values different from each other by about 10° C. or more, and the storage modulus of about 120° C. ($E'_{120}$) relative to the storage modulus of about 50° C. ($E'_{50}$), namely $E'_{120}/E'_{50}$ is set within the range of about 0.15 to about 0.65.

6 Claims, 1 Drawing Sheet

(51) Int. Cl.
    *B29C 49/00*     (2006.01)
    *B29C 51/10*     (2006.01)
    *C08L 45/00*     (2006.01)
    *B29C 45/00*     (2006.01)
    *B29C 47/00*     (2006.01)
    *B29C 47/40*     (2006.01)
    *B29C 49/02*     (2006.01)
    *B29C 49/10*     (2006.01)
    *B29C 49/12*     (2006.01)
    *B29C 51/02*     (2006.01)
    *B29K 23/00*     (2006.01)
    *B29K 105/00*     (2006.01)
    *B29L 7/00*     (2006.01)

(56) References Cited

U.S. PATENT DOCUMENTS

| | | | |
|---|---|---|---|
| 5,270,393 | A | 12/1993 | Sagane et al. |
| 6,255,396 | B1 | 7/2001 | Ding et al. |
| 2008/0069973 | A1 | 3/2008 | Nitta et al. |

FOREIGN PATENT DOCUMENTS

| | | | |
|---|---|---|---|
| JP | H04-161407 | A1 | 6/1992 |
| JP | 9-78054 | A | 3/1997 |
| JP | 9-278974 | | 10/1997 |
| JP | 10-219045 | A | 8/1998 |
| JP | 11-80492 | | 3/1999 |
| JP | 2002-105261 | A | 4/2002 |
| JP | 2003-508623 | A | 3/2003 |
| JP | 2003-321591 | A1 | 11/2003 |
| WO | WO 01/18112 | | 3/2001 |
| WO | WO 2006/030797 | A1 | 3/2006 |
| WO | 2007-132641 | A1 | 11/2007 |

OTHER PUBLICATIONS

"Microstructure and Morphology of Cycloolefin Copolymers" T. Rische, et al., Macromolecules, vol. 31, 1871-1974, American Chemical Society (1998).

"Structural Development in Cycloolefin Copolymers Under Uniaxial Elongational Flow" Pralay Maiti, et al., Journal of Applied Polymer Science, vol. 91, 3421-3427 (2004).

Office Action for Chinese Patent Appln. No. 200880112599.0 mailed May 26, 2011.

Notice of Reasons for Rejection issued to JP Application No. 2007-275237, mailed May 21, 2013.

Office Action issue to CN Application No. 201310076646.3 mailed Aug. 1, 2014.

* cited by examiner

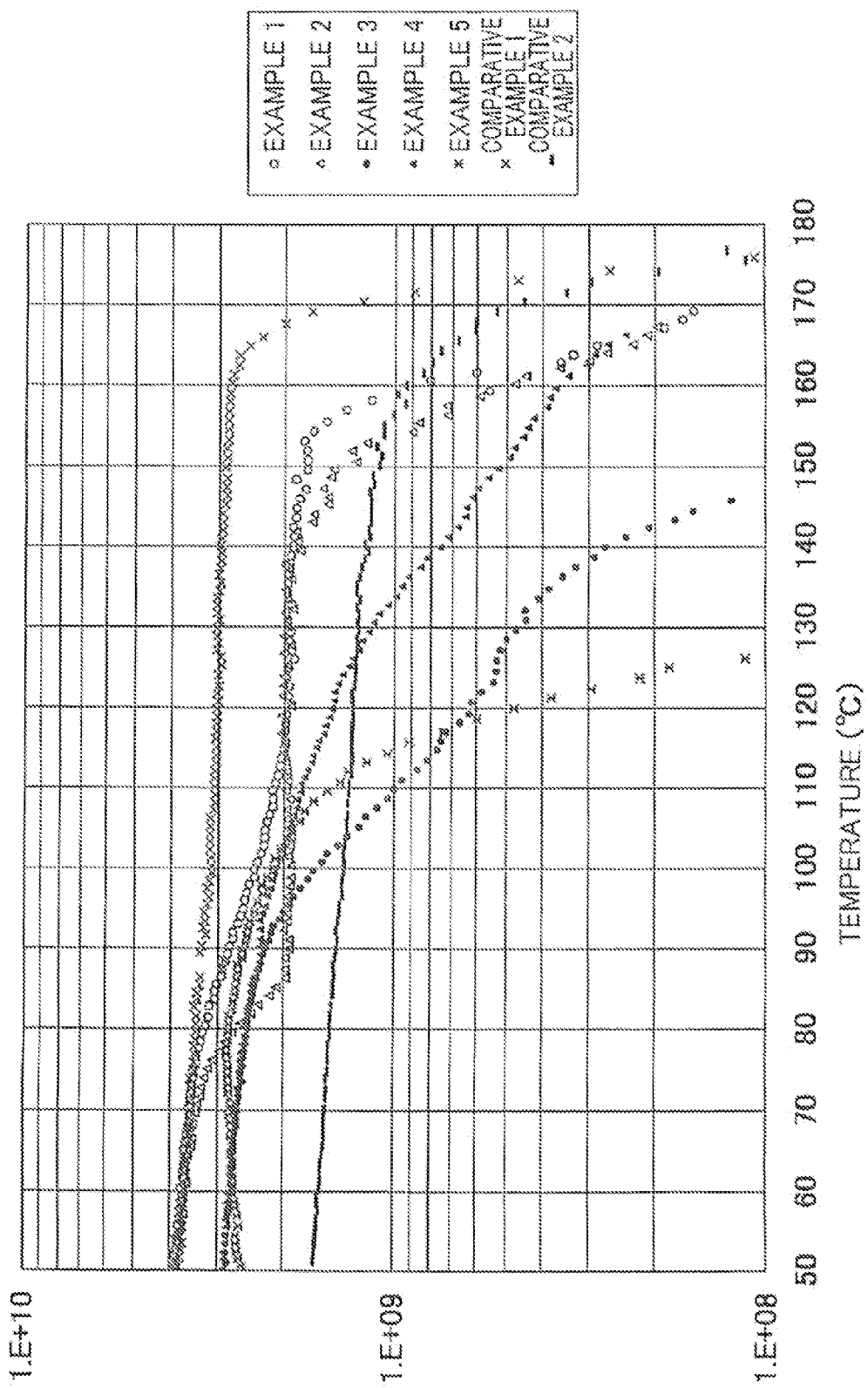

CYCLOOLEFIN RESIN COMPOSITION

TECHNICAL FIELD

The present disclosure relates to a cycloolefin resin composition suited for use in high temperature environments.

BACKGROUND ART

Cycloolefin copolymer resins have been utilized in optical applications due to their superior transparency. In addition, since cycloolefin polymers have favorable heat resistance and water vapor barrier properties, they have attracted attention in fields of packaging materials and sheets for general industry. In particular, taking advantage of amorphous polymer features, a process such as vacuum molding or air-pressure molding in which a sheet or a preform is heated to the softening treatment temperature around the glass transition point and the molding is carried out.

However, since cycloolefin copolymer resins exhibit an abrupt change of softening behavior before and after glass transition during heating, for example, local breaking of film sheets in use at around the glass transition point and in softening molding, and rupture of preforms in injection stretch blow molding can occur.

In order to control the flexibility of a cycloolefin resin, several combinations of cycloolefin resins having different glass transition points have been attempted. For example, Japanese Unexamined Patent Application, First Publication No. 9-278974, the entire disclosure of which is incorporated herein by reference, discloses that a thermally shrinkable cycloolefin polymer tube constituted with a composition having a main glass transition temperature falling within the range of 55 to 90° C. that includes a cycloolefin random copolymer mixed with an olefin resin having a storage modulus of no less than $5 \times 10^9$ dyn/cm$^2$ as measured at a frequency of 10 Hz and a temperature of 30° C. is superior in stiffness.

In addition, Japanese Unexamined Patent Application, First Publication No. 11-80492 discloses that a stretch blow molded bottle composed of a cycloolefin copolymer composition including a cycloolefin copolymer having a glass transition point of 140 to 105° C. blended with a cycloolefin copolymer having a glass transition point of 100 to 60° C. is superior in balance of impact resistance and heat resistance, and also superior in transparency after subjecting to hot filling.

However, these prior art references postulate molding and practical use in a comparatively low temperature range, and use in an environment having a temperature exceeding 140° C. is impossible. For example, mold release films for use in a curing die of thermosetting resins are included.

SUMMARY

A cycloolefin resin composition is provided which includes at least two types of cycloolefin copolymer resins with Tg values of at least about 10° C. apart, wherein a ratio ($E'_{120}/E'_{50}$) of storage modulus of about 120° C. ($E'_{120}$) relative to storage modulus of about 50° C. ($E'_{50}$) falls within the range of about 0.15 to about 0.65.

A cycloolefin resin film is provided formed by melt extrusion molding of the cycloolefin resin composition of the present disclosure.

A method is provided for producing a shape-formed film, which includes shape forming the cycloolefin resin film at a temperature lower than Tg of the cycloolefin resin having the highest Tg among the cycloolefin resins constituting the cycloolefin resin film.

A cycloolefin resin preform formed by injection molding of the cycloolefin resin composition of the present disclosure is provided.

A method is provided for producing an injection stretch blow molded product, which includes shape forming the cycloolefin resin composition preform at a temperature lower than Tg of the cycloolefin resin having the highest Tg among the cycloolefin resins constituting the cycloolefin resin preform.

BRIEF DESCRIPTION OF THE DRAWINGS

FIG. 1 shows a graph illustrating relationships between temperature and storage modulus as described in the Examples and Comparative Examples.

DETAILED DESCRIPTION

The present disclosure was made in order to solve the problems as described above, and an object of the disclosure is to provide a cycloolefin resin composition which controls the flexibility of a cycloolefin resin and may be molded in an environment having a temperature exceeding about 140° C.

In embodiments, a cycloolefin resin composition is provided including cycloolefin copolymer resins with Tg values of at least about 10° C. apart, in which a ratio ($E'_{120}/E'_{50}$) of storage modulus of about 120° C. ($E'_{120}$) relative to storage modulus of about 50° C. ($E'_{50}$) falls within the range of about 0.15 to about 0.65.

In embodiments, due to the ratio ($E'_{120}/E'_{50}$) of storage modulus at about 120° C. ($E'_{120}$) relative to storage modulus at about 50° C. ($E'_{50}$) falling within the range of about 0.15 to about 0.65, in embodiments, from about 0.35 to about 0.60, an abrupt change of the softening behavior before and after glass transition during heating may be lessened. Thus, flexibility may be provided even in a high temperature environment exceeding about 140° C., whereby formability in softening molding may be also improved.

The cycloolefin resin composition of the present disclosure usually has a high storage modulus. Conventional compositions have an almost constant storage modulus until the storage modulus abruptly decreases at around the glass transition point, leading to inferior flexibility at high temperatures. However, when the cycloolefin resin composition of the present disclosure is used, molding may be easily carried out due to low storage modulus in molding. Such ease in molding can be achieved because the storage modulus decreases at about 90° C. to about 120° C. before abruptly decreasing at about the glass transition point, and thereafter the storage modulus is maintained until a temperature about 150° C. is reached, being the glass transition point. In addition, since the storage modulus remains unchanged over a certain temperature range after the storage modulus decreases, productivity may be also improved.

The ratio ($E'_{120}/E'_{50}$) is based on the storage modulus at about 120° C. and the storage modulus at about 50° C. employed as standards for determination. With respect to the former, when such a value is employed at a higher temperature as the standard, the storage modulus abruptly decreases when the temperature is close to the glass transition point. Therefore, such a value cannot be employed as the standard due to a great change of the ratio depending on the extent of decrease. On the other hand, the cycloolefin resin composition of the present disclosure has a storage modulus which does not considerably vary at about 120° C. to about 155° C. As a result, a temperature of about 120° C. will indicate a storage modulus in molding. Another standard is employed at about 50° C. for a similar reason, since the storage modulus does not considerably vary before decreasing, the storage modulus of the cycloolefin resin before decreasing is indicated.

In embodiments, the difference of Tg values of the cycloolefin resin having the highest Tg and of the cycloolefin resin having the lowest Tg may be of from about 30° C. to about 130° C., in embodiments, of from about 70° C. to about 120° C. In embodiments, a difference of less than about 30° C. may be utilized such that a single Tg appears in an intermediate range of Tg of the blended matter, and the storage modulus abruptly decreases near this temperature. A difference exceeding about 130° C. may result in deterioration of heat resistance.

In embodiments, the Tg value of the cycloolefin resin having the highest Tg may be of from about 120° C. to about 200° C., in embodiments, from about 140° C. to about 190° C. A Tg value of no lower than about 120° C. may be utilized such that the heat resistance in practical applications can be sufficiently estimated. In addition, a Tg value of no higher than about 200° C. may result in achieving superior melt formability.

In embodiments, the Tg value of the cycloolefin resin having the lowest Tg may be from about 70° C. to about 100° C. A Tg value of less than about 70° C. may result in insufficient heat resistance. A Tg value of higher than 100° C. may result in difficult control of stepwise alteration of the storage modulus.

A second aspect of the present disclosure provides the cycloolefin resin composition according to the first aspect, in which the storage modulus at 150° C. ($E'_{150}$) is no less than about $1 \times 10^8$.

In embodiments, rigidity may be maintained and satisfactory heat resistance may be achieved due to the storage modulus of about 150° C. ($E'_{150}$) being no less than about $1 \times 10^8$.

A third aspect of the present disclosure provides the cycloolefin resin composition according to the first or second aspect, which includes at least three types of cycloolefin resins with Tg values of at least about 10° C. apart.

In embodiments, use of at least three types of cycloolefin resins with Tg values of at least about 10° C. apart enables the storage modulus to decrease stepwise during heating, and therefore the softening behavior may be controlled more strictly.

In embodiments, the phrase "including at least three types of cycloolefin resins with Tg values of at least about 10° C. apart" may refer to the case, for example, in which one cycloolefin resin has a Tg higher by at least about 10° C. than the lowest Tg, and lower by at least about 10° C. than the highest Tg, but not limited thereto. Thus, the cycloolefin resin composition is not particularly limited as long as it includes a cycloolefin resin having the lowest Tg and a cycloolefin resin having the highest Tg, with the difference between the lowest Tg and the highest Tg being at least about 10° C., and further includes one or more other cycloolefin resin(s).

To include three types of the cycloolefin resins is advantageous since an abrupt decrease of the storage modulus may be prevented, and the storage modulus decreases in a more stepwise manner during heating, whereby the softening behavior may be more strictly controlled as compared with the case in which two types of the cycloolefin resins are included. In contrast, to include two types of the cycloolefin resins is advantageous in terms of capability of keeping the storage modulus constant until the temperature is elevated to a higher range.

In embodiments, the difference between Tg values of the cycloolefin resin having the highest Tg and of the cycloolefin resin having the lowest Tg may be from about 30° C. to about 130° C., in embodiments, from about 70° C. to about 120° C. A difference of no greater than about 30° C. results in a single Tg appearing in an intermediate range of Tg of the blended matter, and the storage modulus abruptly decreasing near this temperature. In addition, a difference of no less than about 130° C. may result in deterioration of the heat resistance.

In embodiments, the Tg value of the cycloolefin resin having the highest Tg may be from about 120° C. to about 200° C., in embodiments, of from about 140° C. to about 190° C. A Tg value of no lower than about 120° C. may be advantageous since the heat resistance in practical applications may be sufficiently estimated. In addition, a Tg value of no higher than about 200° C. may result in superior melt formability.

In embodiments, the Tg value of the cycloolefin resin having the lowest Tg may be from about 70° C. to about 100° C. A Tg value of less than about 70° C. may result in insufficient heat resistance. In addition, a Tg value of higher than about 100° C. may result in difficult control of stepwise alteration of the storage modulus.

A fourth aspect of the present disclosure provides a cycloolefin resin film formed by melt extrusion molding of the cycloolefin resin composition according to any one of the first to third aspects.

According to the forth aspect of the disclosure, a variety of applications can be provided utilizing heat resistance and ease in molding at high temperatures by making the cycloolefin resin composition to have a film shape. As films that necessitate heat resistance and ease in molding at high temperatures, for example, mold release films may be exemplified.

In embodiments, the present disclosure provides a method for producing a shape-formed film characterized by including shape forming the cycloolefin resin film according to the forth aspect at a temperature lower than Tg of the cycloolefin resin having the highest Tg among the cycloolefin resins constituting the cycloolefin resin film.

In embodiments, softening molding under the conditions described above enables molding before an abrupt decrease of the storage modulus without fail. Therefore, rupture and the like of the film in molding can be prevented, whereby the productivity can be improved.

In embodiments, a sixth aspect of the present disclosure provides a cycloolefin resin preform formed by injection molding of the cycloolefin resin composition.

In embodiments, a seventh aspect of the present disclosure provides a method for producing an injection stretch blow molded product characterized by including shape forming the cycloolefin resin composition preform according to the sixth aspect at a temperature lower than Tg of the cycloolefin resin having the highest Tg among the cycloolefin resins constituting the cycloolefin resin preform.

In embodiments, according to the sixth and seventh aspects of the disclosure, a cycloolefin resin preform is made using a cycloolefin resin composition which has favorable flexibility in molding and can be easily molded. Blow molding using such a cycloolefin resin composition can prevent rupture of the preform in an expanding process.

According to the present disclosure, a cycloolefin resin composition can be easily molded in an environment having a temperature exceeding about 140° C. while controlling the flexibility. Easier molding is enabled due to improved flexibility and low storage modulus. In addition, the composition can be molded into a variety of shapes taking advantage of the cycloolefin resin such as heat resistance and the like.

Hereinafter, embodiments of the present disclosure are explained in detail, but the present disclosure is not any way limited to the following embodiments and may be practiced with appropriate modifications in the scope intended by the present disclosure.

More specifically, the present disclosure relates to a cycloolefin resin composition characterized by a ratio ($E'_{120}/E'_{50}$) of storage modulus of about 120° C. ($E'_{120}$) relative to storage modulus of about 50° C. ($E'_{50}$) falling within the range of from about 0.15 to about 0.65 since cycloolefin resins with Tg values of at least about 10° C. apart are contained.

Cycloolefin resins are polymer compounds having a main chain composed of carbon-carbon bonds, in which at least a part of the main chain has a cyclic hydrocarbon structure. This cyclic hydrocarbon structure is introduced by using as a monomer a compound having at least one olefinic double bond in the cyclic hydrocarbon structure (cycloolefin) as typified by norbornene or tetracyclododecene.

The cycloolefin resins are classified into: (1) addition (co)polymers of cycloolefin or hydrogenated products thereof; (2) addition copolymers of cycloolefin and α-olefin or hydrogenated products thereof; and (3) ring-opening (co)polymers of cycloolefin or hydrogenated products thereof.

Specific examples of cycloolefins include monocyclic cycloolefins such as cyclopentene, cyclohexene, cyclooctene, cyclopentadiene and 1,3-cyclohexadiene; bicyclic cycloolefins such as bicyclo[2.2.1]hept-2-ene (common name: norbornene), 5-methyl-bicyclo[2.2.1]hept-2-ene, 5,5-dimethyl-bicyclo[2.2.1]hept-2-ene, 5-ethyl-bicyclo[2.2.1]hept-2-ene, 5-butyl-bicyclo[2.2.1]hept-2-ene, 5-ethylidene-bicyclo[2.2.1]hept-2-ene, 5-hexyl-bicyclo[2.2.1]hept-2-ene, 5-octyl-bicyclo[2.2.1]hept-2-ene, 5-octadecyl-bicyclo[2.2.1]hept-2-ene, 5-methylidene-bicyclo[2.2.1]hept-2-ene, 5-vinyl-bicyclo[2.2.1]hept-2-ene and 5-propenyl-bicyclo[2.2.1]hept-2-ene; tricyclic cycloolefins such as tricyclo[4.3.0.1$^{2,5}$]deca-3,7-diene (common name: dicyclopentadiene), tricyclo[4.3.0.1$^{2,5}$]dec-3-ene; tricyclo[4.4.0.1$^{2,5}$]undeca-3,7-diene or tricyclo[4.4.0.1$^{2,5}$]undeca-3,8-diene, or tricyclo[4.4.0.1$^{2,5}$]undec-3-ene that is a partially hydrogenated product (or an adduct of cyclopentadiene and cyclohexene) thereof; 5-cyclopentyl-bicyclo[2.2.1]hept-2-ene, 5-cyclohexyl-bicyclo[2.2.1]hept-2-ene, 5-cyclohexenyl-bicyclo[2.2.1]hept-2-ene, and 5-phenyl-bicyclo[2.2.1]hept-2-ene; tetracyclic cycloolefins such as tetracyclo[4.4.0.1$^{2,5}$.1$^{7,10}$]dodec-3-ene (also simply referred to as tetracyclododecene), 8-methyltetracyclo[4.4.0.1$^{2,5}$.1$^{7,10}$]dodec-3-ene, 8-ethyltetracyclo[4.4.0.1$^{2,5}$.1$^{7,10}$]dodec-3-ene, 8-methylidenetetracyclo[4.4.0.1$^{2,5}$.1$^{7,10}$]dodec-3-ene, 8-ethylidenetetracyclo[4.4.0.1$^{2,5}$.1$^{7,10}$]dodec-3-ene, 8-vinyltetracyclo[4,4,0.1$^{2,5}$.1$^{7,10}$]dodec-3-ene and 8-propenyl-tetracyclo[4.4.0.1$^{2,5}$.1$^{7,10}$]dodec-3-ene; polycyclic cycloolefins such as 8-cyclopentyl-tetracyclo[4.4.0.1$^{2,5}$.1$^{7,10}$]dodec-3-ene, 8-cyclohexyl-tetracyclo[4.4.0.1$^{2,5}$.1$^{7,10}$]dodec-3-ene, 8-cyclohexenyl-tetracyclo[4.4.0.1$^{2,5}$.1$^{7,10}$]dodec-3-ene, 8-phenyl-cyclopentyl-tetracyclo[4.4.0.1$^{2,5}$.1$^{7,10}$]dodec-3-ene; tetracyclo[7.4.1$^{3,6}$.0$^{1,9}$.0$^{2,7}$]tetradeca-4,9,11,13-tetraene (may be also referred to as 1,4-methano-1,4,4a,9a-tetrahydrofluorene), tetracyclo[8.4.1$^{4,7}$.0$^{1,10}$.0$^{3,8}$]pentadeca-5,10,12,14-tetraene (may be also referred to as 1,4-methano-1,4,4a,5,10,10a-hexahydroanthracene); pentacyclo[6.6.1.1$^{3,6}$.0$^{2,7}$.0$^{9,14}$]-4-hexadecene, pentacyclo[6.5.1.1$^{3,6}$.0$^{2,7}$.0$^{9,13}$]-4-pentadecene, pentacyclo[7.4.0.0$^{2,7}$.1$^{3,6}$.1$^{10,13}$]-4-pentadecene; heptacyclo[8.7.0.1$^{2,9}$.1$^{4,7}$.1$^{11,17}$.0$^{3,8}$.0$^{12,16}$]-5-eicosene, heptacyclo[8.7.0.1$^{2,9}$.0$^{3,8}$.1$^{4,7}$.0$^{12,17}$.1$^{13,16}$]-14-eicosene; and tetramers of cyclopentadiene, and the like. These cycloolefins may be used alone or in combinations of two or more types thereof.

Specific examples of the α-olefin that is copolymerizable with the cycloolefins include ethylene or α-olefins having 2 to 20 carbon atoms, and preferably 2 to 8 carbon atoms such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, and the like. These α-olefins may be used alone or in combinations of two or more types thereof.

The method for polymerizing cycloolefins, or cycloolefins with α-olefins, and the method for hydrogenating the resultant polymer are not especially limited, and can be carried out according to publicly known methods.

In embodiments, the cycloolefin resin may be an addition copolymer of ethylene and norbornene, or of ethylene and tetracyclododecene.

The structure of the cycloolefin resin is not particularly limited and may be linear, branched or crosslinked. In embodiments, the cycloolefin resin may be linear.

The glass transition point (Tg) of the cycloolefin resin used in the present disclosure may be determined by measurement according to a method described in JIS K7121 under a condition of the rate of temperature rise of 10° C./min.

The Tg of the cycloolefin resin has been known to depend on content ratio of the cyclic monomer units included in the polymer structure, and in the case of, for example, random copolymers of norbornene with ethylene, Tg may be no higher than about 100° C. when the content of norbornene is no greater than about 42% by mole, as described in Macromolecules, Vol. 31, 3421, 1871-1874 (1998), the entire disclosure of which is hereby incorporated by reference.

In addition, the Journal of Applied Polymer Science, Vol. 91, 3421 (2004), the entire disclosure of which is hereby incorporated by reference, describes a random copolymer of tetracyclododecene with ethylene, wherein the Tg is 103° C. when the copolymer includes 30% by mole of tetracyclododecene.

However, the cycloolefin resin used in the present disclosure is not specified in terms of the type of comonomer and the sequence structure, but should be defined by results of Tg measurement according to DSC (Differential scanning calorimetry).

It is to be noted that the storage modulus defined in the present disclosure is measured with a solid dynamic viscoelasticity measuring instrument under a condition of a frequency of 1 Hz, and a rate of temperature rise of 3° C./min.

A ratio ($E'_{120}/E'_{50}$) of storage modulus of less than about 0.15 may result in insufficient heat resistance, whereas a ratio exceeding about 0.65 may result in abrupt change to softening during heating, thereby causing defective molding and local breaking of the sheet. In embodiments, the ratio ($E'_{120}/E'_{50}$) of storage modulus may be in the range of about 0.35 to about 0.60.

Additionally, the storage modulus of about 150° C. ($E'_{150}$) may be no less than about 1×10$^8$ for development in applications in which heat resistance is of great importance.

Still further, other aspects of the present disclosure include a cycloolefin resin film formed by melt extrusion molding of a cycloolefin resin composition characterized by a ratio ($E'_{120}/E'_{50}$) of storage modulus of about 120° C. ($E'_{120}$) relative to storage modulus of about 50° C. ($E'_{50}$) falling within the range of from about 0.15 to about 0.65 since cycloolefin resins with Tg values of at least about 10° C. apart are contained, as well as a method for softening molding of the film.

With regard to the molding temperature of the softening molding, shape forming may be carried out at a temperature lower than Tg of the cycloolefin resin having the highest Tg among the cycloolefin resins constituting the film for maintaining superior formability.

Alternatively, further aspects of the present disclosure include a cycloolefin resin preform formed by injection molding of a cycloolefin resin composition characterized by a ratio (E' E'$_{50}$) of storage modulus of about 120° C. (E'$_{120}$) relative to storage modulus of about 50° C. (E'$_{50}$) falling within the range of from about 0.15 to about 0.65 since cycloolefin resins with Tg values of at least about 10° C. apart are contained, as well as a stretch blow molding method of the preform.

With regard to the molding temperature conditions of the stretch blow molding, shape forming may be carried out at a temperature lower than Tg of the cycloolefin resin having the highest Tg among the cycloolefin resins constituting the film.

Moreover, another aspect of the present disclosure includes a cycloolefin resin composition prepared by blending the cycloolefin resin with at least one other resin. The other resin which may be used in such a cycloolefin resin composition is not particularly limited as long as it is a thermoplastic resin. Specifically, illustrative examples of the other resin include commodity polyolefin resins such as high density polyethylene (HDPE), low density polyethylene (LDPE), linear low density polyethylene (LLDPE) and polypropylene, vinyl resins such as polystyrene, polyacrylic esters and polymethacrylic esters, polyester resins such as polyethylene terephthalate and polybutylene terephthalate, polyamide resins such as nylon 6 and nylon 66. These may be used alone, or two or more may be used in combination. Moreover, thermoplastic elastomers prepared by modifying the aforementioned resins can be also used as a material resin of the cycloolefin resin composition.

In embodiments, blending the resins may be conducted by either dry blending, or compounding.

With respect to the cycloolefin resin composition, the cycloolefin resin relative to the entire composition in terms of percent by weight may be from about 99% by weight to about 50% by weight, in embodiments from about 95% by weight to 50% by weight, in embodiments from about 93% by weight to about 60% by weight, and in still other embodiments from about 90% by weight to about 65% by weight.

A variety of additives may be added to the cycloolefin resin composition as needed in a range that does not deteriorate the properties of the composition. The variety of additives are not particularly limited as long as they are commonly used in thermoplastic resin materials, and examples thereof include an antioxidant, an ultraviolet ray absorbing agent, a light stabilizer, a plasticizer, a lubricant, an antistatic agent, a fire retardant, a colorant such as a dye or a pigment, a near-infrared radiation absorbing agent, a fluorescent whitening agent, a filler, and the like.

The film of the cycloolefin resin and/or the resin composition thereof referred to herein includes a film and a sheet, which may have a thickness of in embodiments, from about 0.1 μm to about 2 mm, in other embodiments from about 1 μm to 1 mm. The cycloolefin resin film of the present disclosure may be any of unstretched, uniaxially stretched, and biaxially stretched films. Although the method of forming the film is not particularly limited, an example may include an extrusion method.

The shape forming step means to mold a film or a preform so as to have a shape to meet the application. When the cycloolefin resin composition of the present disclosure is used, molded products having a variety of shapes can be easily obtained since the composition has adequate flexibility at molding temperatures. In addition, the method for producing the shape-formed film, and the method for producing the injection stretch blow molded product of the present disclosure are not particularly limited as long as the cycloolefin resin composition of the present disclosure is employed as a material.

The shape-formed film also includes in addition to those provided as final products, those provided as non-final products for use in production step of a certain product (mold release film, etc.).

EXAMPLES

Hereinafter, the present disclosure will be explained in more detail by way of Examples, but the present disclosure is not limited thereto.

After dry blending various cycloolefin resin pellets shown in Table 1 at ratios shown in Table 2, the pellets of Examples and Comparative Examples were subjected to melt extrusion at a predetermined temperature with about 30 mmφ biaxial extruder using a constant-volume feeder. Samples were prepared by molding to give a sheet having a thickness of about 0.2 mm by hot pressing, and then cutting the sheet into a strip of about 4 mm×20 mm. The dynamic viscoelasticity of the samples was measured with RSA type III (commercially available from Rheometrix Scientific Inc.). The results are demonstrated in a graph shown in FIG. 1. Moreover, the results of the ratio (E'$_{120}$/E'$_{50}$) of storage modulus of about 120° C. (E'$_{120}$) relative to storage modulus of about 50° C. (E'$_{50}$) are also shown in Table 2 together with the composition.

TABLE 1

| Number | Trade name | Chemical name | Glass transition temperature (° C.) | Manufacturer |
|---|---|---|---|---|
| A1 | TOPAS 6017F-04 | Copolymer of ethylene with norbornene | 180 | Polyplastics |
| A2 | TOPAS 6013F-04 | Copolymer of ethylene with norbornene | 140 | Polyplastics |
| A3 | TOPAS 8007F-04 | Copolymer of ethylene with norbornene | 80 | Polyplastics |
| B1 | Evolue SP2320 | LLDPE | | Mitsui Chemicals |

TABLE 2

| | Example 1 | Example 2 | Example 3 | Example 4 | Example 5 | Comparative Example 1 | Comparative Example 2 | Comparative Example 3 |
|---|---|---|---|---|---|---|---|---|
| A1 (%) | 80 | 50 | 40 | 60 | | 100 | 80 | |
| A2 (%) | | | 30 | 20 | 80 | | | |

TABLE 2-continued

|  | Example 1 | Example 2 | Example 3 | Example 4 | Example 5 | Comparative Example 1 | Comparative Example 2 | Comparative Example 3 |
|---|---|---|---|---|---|---|---|---|
| A3 (%) | 20 | 50 | 30 | 20 | 20 |  |  | 100 |
| B1 (%) |  |  |  |  |  |  | 20 |  |
| E'$_{50}$ (Pa) | $3.90 \times 10^9$ | $3.88 \times 10^9$ | $2.82 \times 10^9$ | $2.88 \times 10^9$ | $2.57 \times 10^9$ | $3.88 \times 10^9$ | $1.65 \times 10^9$ | $2.08 \times 10^9$ |
| E'$_{120}$ (Pa) | $2.00 \times 10^9$ | $2.03 \times 10^9$ | $0.62 \times 10^9$ | $1.49 \times 10^9$ | $0.48 \times 10^9$ | $3.00 \times 10^9$ | $1.30 \times 10^9$ | melted |
| E'$_{120}$/E'$_{50}$ | 0.51 | 0.52 | 0.21 | 0.52 | 0.19 | 0.77 | 0.79 | — |
| E'$_{150}$ (Pa) | $1.73 \times 10^9$ | $1.35 \times 10^9$ | $8.90 \times 10^7$ | $5.26 \times 10^8$ | — | $1.09 \times 10^9$ | — | — |

From the results shown in Table 2 and FIG. 1, it was ascertained that the values of the storage modulus of Examples 1 and 2 slightly decreased with temperature elevation, but thereafter almost equivalent values were maintained until the temperature was elevated to approximately 150° C. These findings suggest improvement of flexibility of the cycloolefin resin compositions, and therefore the resin composition can be molded in an environment having a temperature exceeding about 140° C. Although Examples 3 and 4 did not exhibit a constant storage modulus at higher temperatures, an abrupt decrease of the storage modulus was prevented, leading to verification that the softening behavior can be controlled. Example 5 revealed that certain effects can be achieved even though a copolymer of ethylene and norbornene having a low glass transition point was used. Contrary to these Examples, the results of Comparative Example 1 revealed that the storage modulus of Comparative Example 1 was kept constant until the temperature was elevated to the glass transition point, but abruptly decreases around the glass transition point. In Comparative Example 1, it was impossible to carry out the molding due to high storage modulus. Similarly to Comparative Example 1, Comparative Example 2 also exhibited an abrupt decrease of the storage modulus at around the glass transition point. Although the storage modulus of Comparative Example 2 is lower as compared with that of Comparative Example 1, use at high temperatures is hampered resulting from inferior heat resistance, and thus limitation of applications is obliged.

What is claimed is:

1. A cycloolefin resin composition comprising:
   at least two types of cycloolefin copolymer resins, wherein:
   1) a Tg of a cycloolefin resin having the highest Tg is no less than 120° C. and no more than 200° C.;
   2) a Tg of a cycloolefin resin having the lowest Tg is no less than 70° C. and no more than 100° C.; and
   3) the difference between the Tg value of the cycloolefin resin having the highest Tg and the Tg value of the cycloolefin resin having the lowest Tg is between 70° C. and 120° C.; and
   wherein a ratio (E'$_{120}$/E'$_{50}$) of storage modulus of about 120° C. (E'$_{120}$) relative to storage modulus of about 50° C. (E'$_{50}$) falls within the range of from about 0.15 to about 0.65; and wherein the storage modulus (E'$_{150}$) at 150° C. is no less than $1 \times 10^8$.

2. The cycloolefin resin composition according to claim 1, comprising: at least three types of cycloolefin resins with Tg values of at least about 10° C. apart.

3. A method for producing a cycloolefin resin film, the method comprising forming of the cycloolefin resin composition according to claim 1 by melt extrusion molding.

4. A method for producing a shape-formed film, comprising:
   shape forming the cycloolefin resin film according to claim 3 at a temperature lower than Tg of the cycloolefin resin having the highest Tg among the cycloolefin resins constituting the cycloolefin resin film.

5. A method for producing a cycloolefin resin preform, the method comprising forming of the cycloolefin resin composition according to claim 1 by injection molding.

6. A method for producing an injection stretch blow molded product, comprising:
   shape forming the cycloolefin resin composition preform according to claim 5 at a temperature lower than Tg of the cycloolefin resin having the highest Tg among the cycloolefin resins constituting the cycloolefin resin preform.

* * * * *